Figure 1:
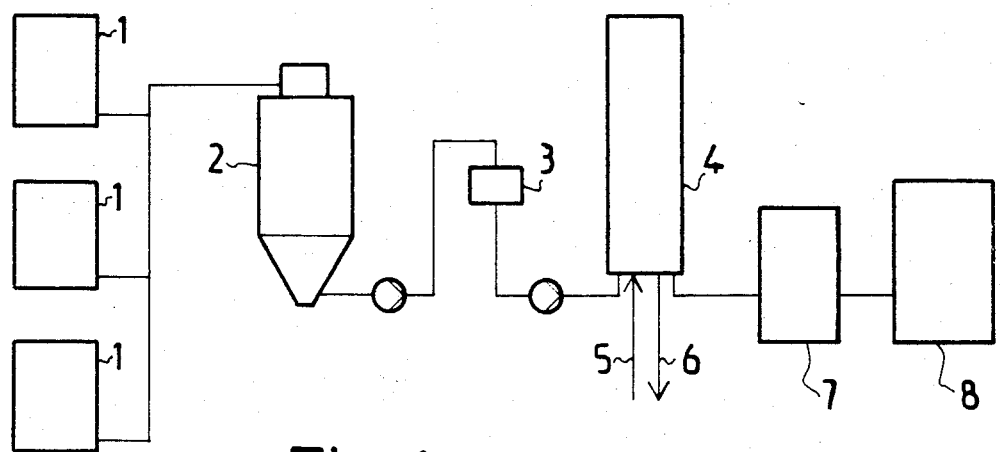

United States Patent [19]

Haartti et al.

[11] Patent Number: 4,565,602
[45] Date of Patent: Jan. 21, 1986

[54] METHOD FOR TREATING CELLULOSE OBTAINED FROM CELLULOSE COOKING PROCESS

[75] Inventors: Juhani Haartti, Taipalsaari; Pertti Heitto, Espoo; Jaakko J. Helsto, Helsinki; Nuutti Vartiainen, Saimaanharju, all of Finland

[73] Assignee: Larox Oy, Lappenranta, Finland

[21] Appl. No.: 578,127

[22] Filed: Feb. 8, 1984

[30] Foreign Application Priority Data

Feb. 17, 1983 [FI] Finland ................................. 830542

[51] Int. Cl.$^4$ ............................................. D21C 9/02
[52] U.S. Cl. ...................................... 162/56; 162/60; 162/70
[58] Field of Search ...................... 162/19, 56, 17, 60, 162/13, 18, 220, 52, 70; 8/156

[56] References Cited

U.S. PATENT DOCUMENTS

| | | | |
|---|---|---|---|
| 223,670 | 1/1880 | Farrell | 162/56 |
| 2,772,138 | 11/1956 | Evans | 162/19 |
| 3,564,631 | 2/1971 | Burling | 162/56 |
| 4,451,331 | 5/1984 | Raggam et al. | 162/56 |

FOREIGN PATENT DOCUMENTS 510549 6/1976 U.S.S.R. ................................. 162/60

Primary Examiner—Peter Chin

[57] ABSTRACT

The present invention seeks to provide a method for treating the cellulose obtained from the cellulose cooking process for paper-making purposes. According to this method, the cellulose is separated from black liquor or other similar waste slurry produced in the cooking process by means of compression and washed, bleached and dried, and an essential feature of the present invention is that all the phases of treatment are carried out in a pressure filter (4). The treatment is performed so that black liquor or similar waste slurry is first compressed from the cellulose pulp slurry, whereafter the resulting cellulose cake is washed by conducting washing liquid into the filter, after which the cellulose is bleached by treating the cake with one or several bleaching chemicals led into the filter and by re-washing, if necessary, the cake between the various bleaching phases, and finally, the cellulose cake is dried and removed from the filter.

7 Claims, 7 Drawing Figures

METHOD FOR TREATING CELLULOSE OBTAINED FROM CELLULOSE COOKING PROCESS

The object of the present invention is to provide a method for treating the cellulose obtained from the cellulose cooking process for paper-making purposes, wherein the cellulose is separated from black liquor or similar slurry produced by cooking and then washed, bleached and dried.

It has been conventional to process the cellulose into bleached paper pulp by employing a drum filtering process involving 3 to 5 phases, or by using a diffuser tower which, too, involves several phases. The said equipment is used for separating the cellulose from the black liquor or, depending on the cooking process, other waste slurry obtained as a result of cooking as well as for washing the cellulose. The washed cellulose thereby obtained is in the form of pulp and has a consistency of about 10 to 15%, and it is then assorted and stored, whereafter it is pumped into the following bleaching phase. Bleaching is carried out in 1 to 7 phases with equipment consisting of reactor towers and associated washing filters, steam mixers, and transport equipment, or by employing the rejection bleaching process which involves the use of reactor towers with built-in diffusers. Various bleaching chemicals, such as chlorine, natron lye, hypochloride, chlorine dioxide, nitrogen peroxide etc., can be used for bleaching.

The object of the present invention is to provide a method whereby the cellulose obtained from the cooking phase is processed into washed and bleached cellulose suitable for paper making in a more simple and economical manner. The present invention is characterized in that the treatment is carried out by means of a pressure filter so that the black liquor or similar waste slurry is first compressed from the cellulose fed into the filter, then the resulting cellulose cake is washed by leading washing liquid into the filter, whereafter the cellulose is bleached with one or several bleaching chemicals while, if necessary, washing the cake between the various phases of bleaching, and finally, the bleached cellulose cake is dried and removed from the filter.

The advantages provided by the present invention as compared to conventional processes are lower investment costs, reduced water and energy consumption as well as diminished environmental damage.

When employing a process of the present invention, the pressure filter should desirably be of the chamber filter type which embodies a filtering cloth and a compression membrane, and the cellulose coming from the cooling apparatus is fed between these.

When employing a process of the present invention, cellulose feed and black liquor separation by means of compression can be carried out so that the resulting cellulose cake has a thickness of 5 to 80 mm and a dry matter content of 10 to 80%. Following this, the cellulose cake can be compressed to a corresponding dry matter content after each washing phase. Along with compression, compressed air can be used in the final drying phase—after which the bleached cellulose cake is removed from the filter—whereby a higher dry matter content permitting the baling of the cellulose can be achieved.

Figure 2:
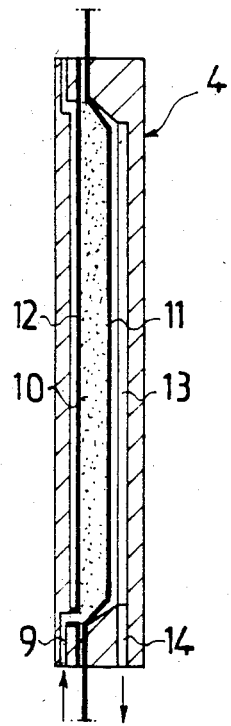
Figure 3:
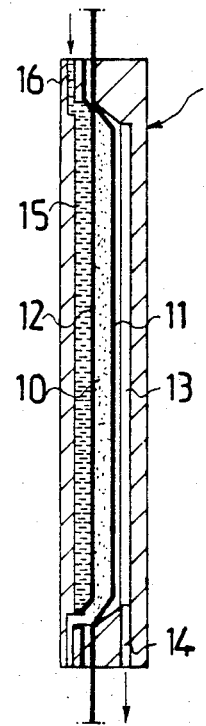

The present invention is explained in greater detail by means of examples and with reference to enclosed drawings in which FIG. 1 is a diagram illustrating the treatment of cellulose pulp obtained from the cooking process to produce bleached cellulose at a sulphate mill FIG. 2 is a diagram illustrating the feeding of the cellulose pulp into the chamber filter which performs the separation of black liquor as well as washing and bleaching FIG. 3 illustrates the compression of the cellulose pulp to separate black liquor.

Figure 4:
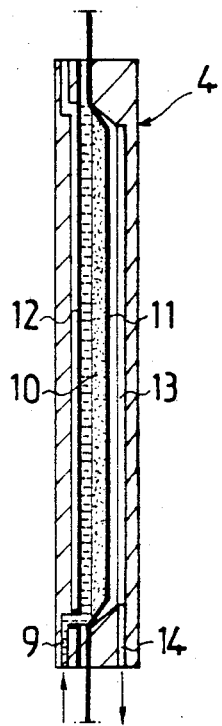
Figure 5:
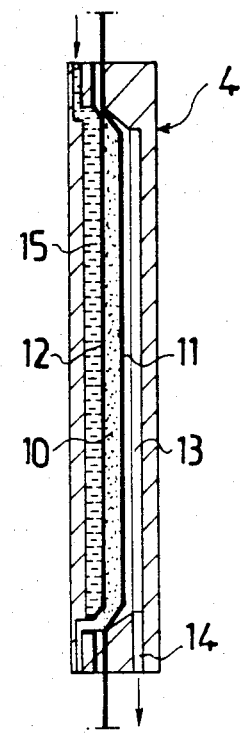
Figure 6:
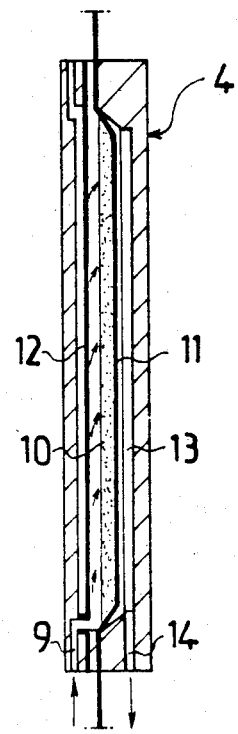
Figure 7:
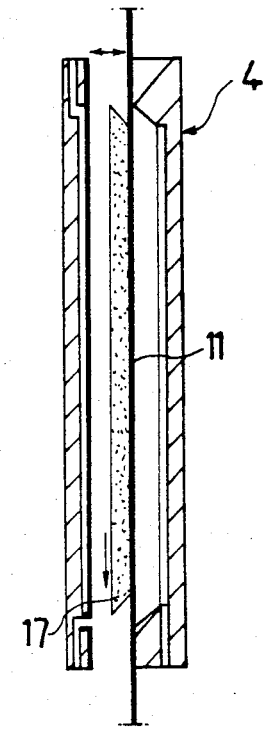

FIG. 4 illustrates the washing and bleaching of the resulting cellulose cake with bleaching chemicals FIG. 5 illustrates the compression phase following washing or bleaching FIG. 6 illustrates the drying of the cellulose cake with compressed air FIG. 7 illustrates the removal of the dried cellulose cake from the chamber filter.

FIG. 1 is a diagram illustrating, in accordance with the present invention, how the cellulose pulp consisting of cellulose and black liquor obtained from the cellulose cooking process at a sulphate mill is processed into bleached cellulose to be used for paper making. The slurry is cooked in batch digesters (1) from where the cellulose pulp slurry is first led to the buffer receiver (2) and then, via the knot separator (3), to the chamber filter (4). The chamber filter (4) separates first the black liquor by means of compression, after which the cellulose cake is washed with water and bleached with one or several bleaching chemicals and, if necessary, rewashed between the various phases of bleaching. In FIG. 1, the arrow (5) indicates the feeding of the washing water and bleaching chemicals into the filter (4), and the arrow (6) shows the water and bleaching chemicals leaving the filter. After bleaching, the cellulose cake is dried with compressed air and removed from the filter (4) to the baling station (7) and then to the storage room (8).

The first phase of treatment to take place in the chamber filter (4) is the feeding of the cellulose pulp slurry into the filter via the inlet channel (9) as illustrated in FIG. 2. In the filter (4), the cellulose pulp fills the space (10) which is bounded, on one side, by the filter cloth (11) and, on the other, by the compression membrame (12). On the other side of the filter cloth there is the space (13) into which the liquids separated in the space (10) in the course of the process trickle, and which is fitted with the outlet channel (14).

When the space (10) of the pressure filter (4) is filled with cellulose pulp slurry, the first compression phase presented in FIG. 3 to separate black liquor is initiated. Compression is effected by leading, via the channel (16), compressed air or liquid into the space (15) which is located opposite to the space (10) of the compression membrane (12), whereupon the compression membrane is pressed against the cellulose pulp slurry and the black liquor is separated from the cellulose and passes through the filtering cloth into the space (13) from where it is removed via the channel (14). After completion of the compression phase, the compressed air or liquid is removed from the space (15).

After the compression phase, there follows the washing phase presented in FIG. 4, in which washing water is led to the cellulose cake formed inside the space (10) as a result of compression via the channel (9). The washing water is filtered through the cellulose cake and the filtering cloth (11) into the space (13) from where it is removed via the channel (14). The removal of washing water is stimulated by compressing the cake as presented in FIG. 5, which is effected by leading compressed air or liquid in the space (15) in the same manner as illustrated above in FIG. 3.

Following the washing phase, the cellulose is bleached by treating cake in the space (10) with one or several bleaching chemicals and, if necessary, re-washing the cake between the bleaching phases. Bleaching is carried out analoguously with the washing process illustrated in FIG. 4, that is by leading the bleaching chemical via the channel (9) in the space (10) where it reacts with the cellulose and is removed through the filtering cloth (11) into the space (13) and is led away via the channel (14). The re-washing phases carried out between the various bleaching phases are performed in the same way as described above. One example of a bleaching treatment employing several phases is a process in which the cellulose in the space (10) is successively treated with chlorine, natrium hydroxide and natrium hypochloride while the cake is re-washed between each phase of bleaching.

After the cellulose cake in the space (10) is bleached and pre-dried in accordance with FIG. 5, the final drying of the cake is carried out by leading compressed air into the space (10) via the channel (9) as illustrated in FIG. 6. The compressed air passes through the cellulose cake and the filtering cloth (11) and is removed via the space (13) and the channel (14) in the same way as the washing water and the bleaching chemicals. Drying is continued until the final dry matter content is achieved, after which the cellulose is transferred to the baling station (7) presented in FIG. 1, and the removal of the cellulose from the filter is performed by opening the filter in accordance with FIG. 7. The bleached and dried cellulose cake illustrated in FIG. 7 is indicated by reference no. 17.

Filling the space (10) of the chamber filter (4) with cellulose pulp slurry for the initial phase of the treatment should be carried out by adjusting the amount so that the cellulose cake will have a thickness of 5 to 80 mm and a consistency of 10 to 80%. After each washing phase, the cellulose cake can be compressed to have an equivalent dry matter content.

For those skilled in the art, it is apparent the embodiments of the present invention are not confined to the examples presented above but can vary within the framework of the patent claims given below. Consequently, it is not necessary for the method presented herein to involve full bleaching of the cellulose; instead, it can be applied to a semi-bleaching process in which case the final bleaching can be carried out using some other method.

We claim:

1. A method for treating cellulose obtained from a pulp digestion process for paper making purposes, the treatment being carried out in a chamber filter comprising a filter cloth and a compression membrane defining therebetween a chamber for the intake of the cellulose to be treated, as well as a first space on the other side of the compression membrane for the intake of a compression medium and a second space on the other side of the filter cloth for receiving and disposing of materials separated from the cellulose, said method comprising the steps of:
    (a) feeding into said chamber defined by said filter cloth and said membrane a cellulose pulp slurry containing waste digestion liquor
    (b) introducing into said first space a pressurized medium to compress said membrane and pulp and separate said waste digestion liquor from the cellulose through said filter cloth and into said second space;
    (c) removing said compression medium from said first space;
    (d) feeding water into said chamber to wash said cellulose and removing the resulting wash liquor through said second space;
    (e) feeding a bleaching medium into said chamber to bleach said cellulose;
    (f) passing a drying medium through said cellulose while retaining it in said chamber; and
    (g) removing the cellulose from said chamber.

2. A method according to claim 1, wherein washing of the cellulose in step (d) is accomplished by feeding a pressurized medium into said first space so as to separate the washing medium from the cellulose by compression, and thereafter said pressurized medium is removed from said first space.

3. A method according to claim 1, wherein a residual liquor is obtained from bleaching step (e) and is separated in said second space.

4. A method according to claim 1, wherein the bleaching and washing of the cellulose is accomplished in a plurality of successive steps.

5. A method according to claim 4, wherein at least the final washing step is aided by feeding a pressurized medium into said first space so as to separate the washing medium from the cellulose by compression, and thereafter said pressurized medium is removed from said first space.

6. A method according to claim 1, wherein the drying medium used in step (f) is compressed air.

7. A method according to claim 6, wherein the cellulose is dried by feeding compressed air into said chamber containing the cellulose and by passing the air through said filter cloth to said second space.

* * * * *